United States Patent [19]

Ikari

[11] Patent Number: 5,162,391

[45] Date of Patent: Nov. 10, 1992

[54] OXYGEN PERMEABLE HARD CONTACT LENS

[75] Inventor: Masahiro Ikari, Kurashiki, Japan

[73] Assignee: Kuraray Co., Ltd., Kurashiki, Japan

[21] Appl. No.: 487,211

[22] Filed: Mar. 1, 1990

[30] Foreign Application Priority Data

Mar. 10, 1989 [JP]  Japan .................................. 1-58788

[51] Int. Cl.$^5$ ............................................. C08F 20/22
[52] U.S. Cl. ..................................... 523/107; 526/245
[58] Field of Search ......................... 526/245; 523/107

[56] References Cited

U.S. PATENT DOCUMENTS

| | | | |
|---|---|---|---|
| 4,327,203 | 3/1982 | Deichert et al. .................... | 526/279 |
| 4,633,003 | 12/1986 | Falcetta et al. .................... | 556/419 |
| 4,652,622 | 3/1987 | Friends et al. .................... | 526/279 |
| 4,711,943 | 12/1987 | Harvey, III ........................ | 526/279 |
| 4,829,137 | 5/1989 | Stuyan ............................... | 526/245 |
| 4,911,986 | 3/1990 | Keryk et al. ....................... | 428/447 |

FOREIGN PATENT DOCUMENTS

| | | |
|---|---|---|
| 59-28127 | 2/1959 | Japan . |
| 58-194014 | 11/1983 | Japan . |
| 60-131518 | 7/1985 | Japan . |
| 61-57612 | 3/1986 | Japan . |
| 61-87102 | 5/1986 | Japan . |
| 61-281116 | 12/1986 | Japan . |
| 61-281216 | 12/1986 | Japan . |
| 61-285426 | 12/1986 | Japan . |
| 62-38419 | 2/1987 | Japan . |
| 62-54220 | 3/1987 | Japan . |

Primary Examiner—Paul R. Michl
Assistant Examiner—LaVonda R. Dewitt
Attorney, Agent, or Firm—Burns, Doane, Swecker & Mathis

[57] ABSTRACT

The hard contact lenses of the present invention are, being formed of copolymers comprising as its essential components a siloxanylalkylamide unit and a monomer unit containing fluorine, excellent in oxygen permeability, wettability with water, resistance to soiling by protein, lipids or the like, transparency and mechanical strength.

8 Claims, 3 Drawing Sheets

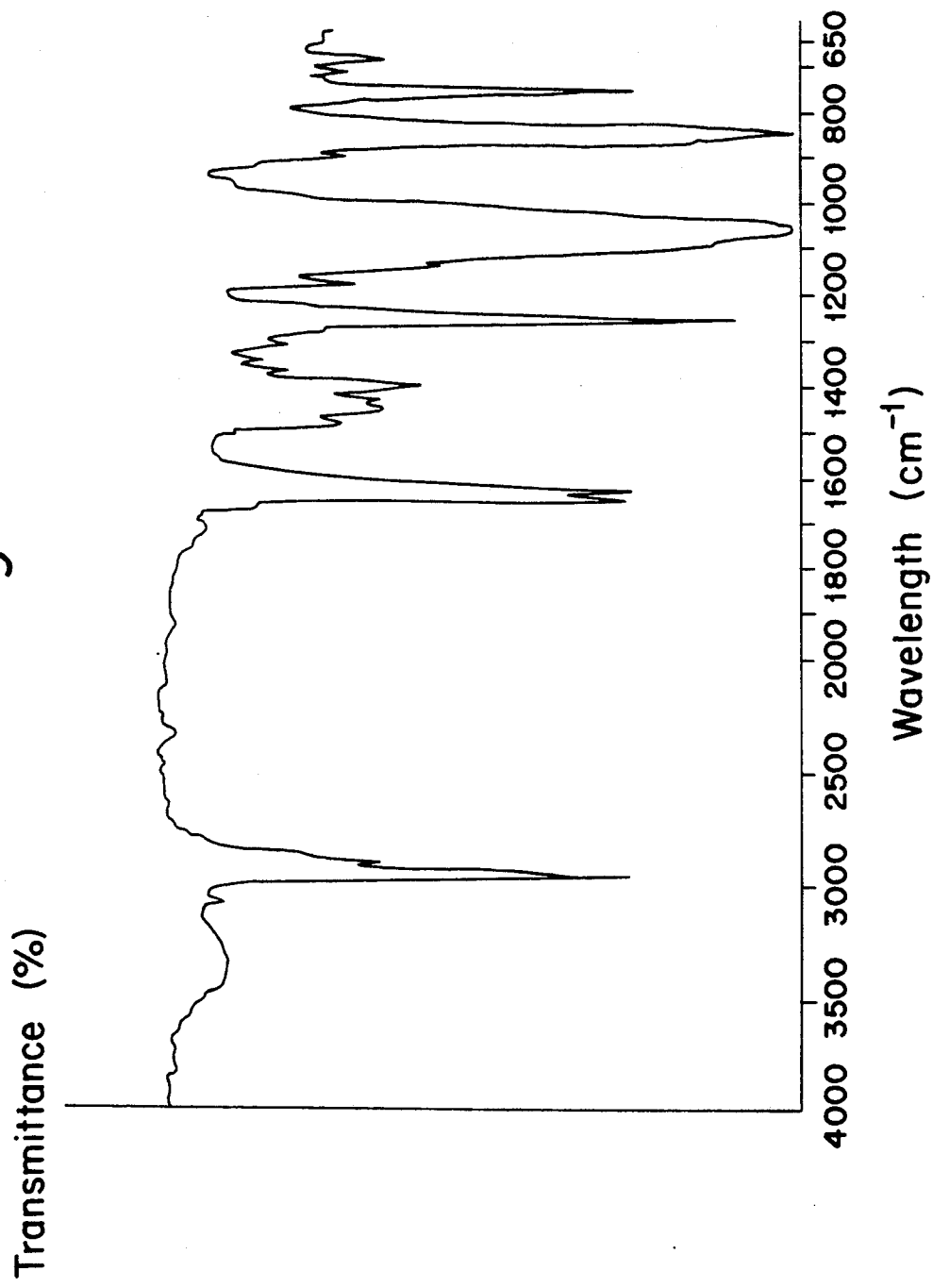

OXYGEN PERMEABLE HARD CONTACT LENS

BACKGROUND OF THE INVENTION

1. Field of the Invention

The present invention relates to oxygen permeable hard contact lenses, and more specifically to oxygen permeable hard contact lenses formed of copolymers comprising specific compounds as constituents.

2. Description of the Prior Art

Heretofore, soft contact lenses formed of polymers comprising 2-hydroxyethyl methacrylate or vinylpyrrolidone as their principal constituent, which contain water, and hard contact lenses formed of polymers comprising as their principal constituent methyl methacrylate (MMA), fluoroalkyl methacylate or silicone methacrylate, which do not contain water, have been available on the market.

However, conventional water-containing soft contact lenses mentioned above have low oxygen permeabilities, and hence they cannot be worn over a long period of time or are unusable due to their low mechanical strength.

On the other hand, conventional hard contact lenses, which do not contain water, comprising MMA as their principal constituent have almost no oxygen permeabilities, and hence they have a significant drawback of being difficult to continuously wear over a long period of time. Conventional hard contact lenses comprising silicone methacrylate as their principal constituent are, while they have higher oxygen permeabilities than those comprising MMA as principal constituent, still insufficient for a long-period continuous use and low in wettability and further have a drawback of being readily soiled with lipids and the like.

In recent years, several contact lenses have been proposed to solve the above-mentioned problems, such as one containing an increased amount of silicone methacrylate and one containing fluorine atom. For example, Japanese Patent Publication No. 8769/1987 and Japanese Patent Application Laid-open No. 28127/1984 disclose an oxygen permeable hard contact lense comprising fluoroalkyl methacrylate and siloxanylalkyl (glycerol) (meth)acrylate. Japanese Patent Application Laid-open Nos. 131518/1985, 57612/1986, 281116/1986, 281216/1986, 285426/1986 and 54220/1987 disclose an oxygen permeable hard contact lens comprising siloxanylpropyloxy ethyl (meth)acrylate and alkyl (meth)acrylate or alkyl itaconate. Further Japanese Patent Application Laid-open Nos. 87102/1986 and 38419/1987 disclose an oxygen permeable hard contact lens comprising fluoroalkylsiloxanyl (glycerol) (meth)acrylate.

U.S. Pat. No. 4,711,943 discloses a water-containing soft contact lens formed of a material having both an amide structure and a siloxane structure and having water content of 15 to 60%, an oxygen permeability of at least $25 \times 10^{10}$ cm$^3$.cm/cm$^2$.sec.cmHg, a tear strength of at least 1.0 g/mm$^2$ and an elongation of at least 80%.

In any one of the above improvements, i.e. the increased content of silicone methacrylate, the incorporation of fluorine atom or incorporation of fluorine atom together with silicone methacrylate, the acquired increase in oxygen permeability always leads to reduction in wettability, thereby rendering the lens cloudy or readily to be soiled by lipids and the like during use. Accordingly, there has been desired an oxygen permeable hard contact lens which maintains both high oxygen permeability and wettability and at the same time has high mechanical strength, transparency and resistance to soiling.

SUMMARY OF THE INVENTION

An object of the present invention is to provide a hard contact lens which has not only high oxygen permeability, but excellent wettability as well, thus giving a comfortable feel when worn.

Another object of the present invention is to provide a hard contact lens which is highly machinable and, moreover, has high mechanical strength.

Still another object of the present invention is to provide a hard contact lens which shows high resistance to soiling so that it does not frequently require chemical solution treatment.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 3 is an infrared absorption spectrum of N-methyl-N-[tris(trimethylsiloxy)silyl]propylmethacrylamide of prepared in Reference Example 2 of the present invention.

DETAILED DESCRIPTION OF THE INVENTION

Figure 1:
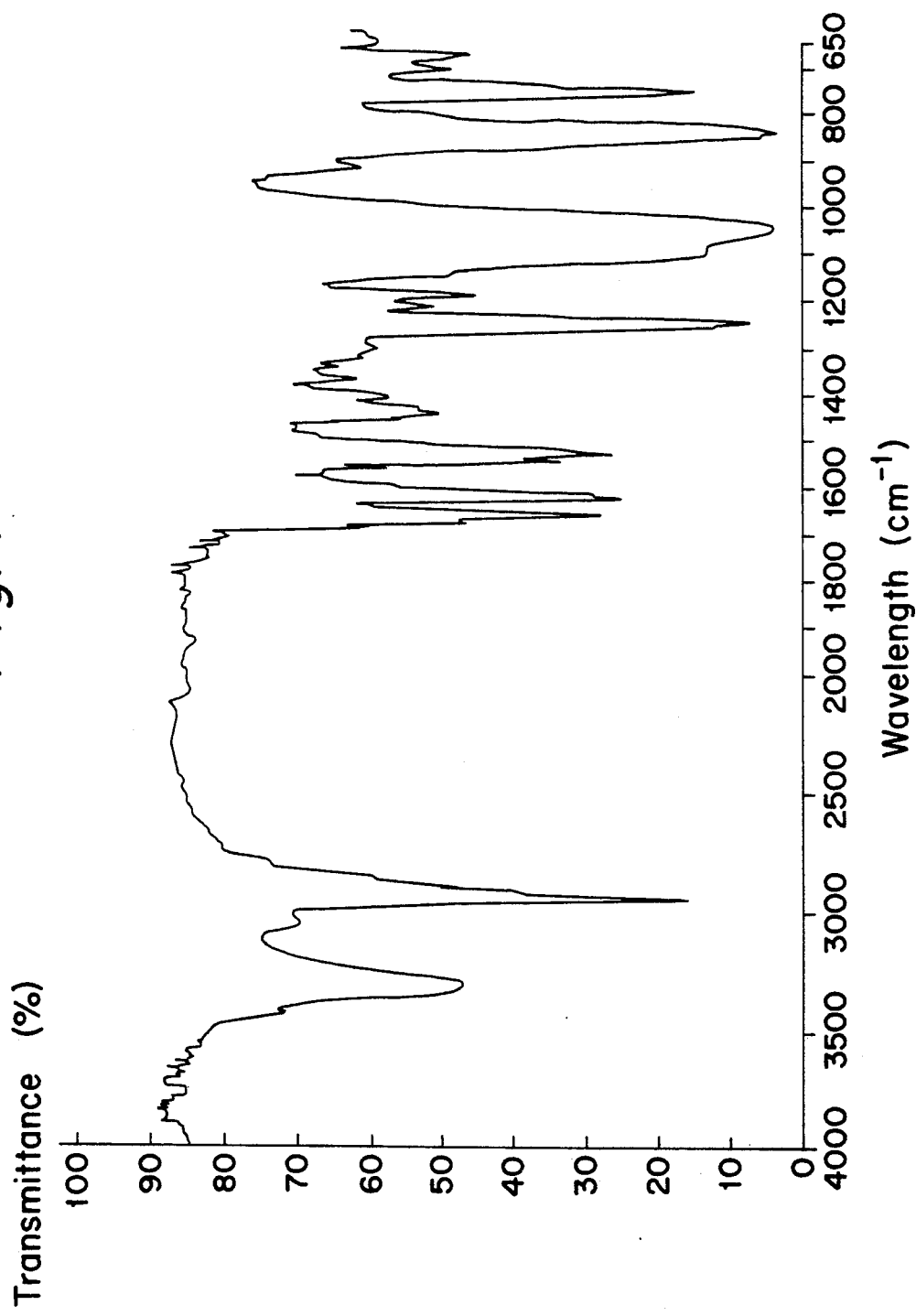
FIG. 1 is an infrared spectrum of N-[tris(trimethylsiloxy)silyl]propylmethacrylamide prepared in Reference Example 1 of the present invention.

The present inventor has intensively studied to achieve the above objects and has found that a hard contact lens comprising a copolymer having specific monomer units as its constituents has high oxygen permeability, high wettability and high resistance to soiling and, at the same time, is satisfactory in mechanical strength and transparency.

Thus, the present invention provides a contact lens formed of a copolymer comprising as its essential constituents:

a siloxanylalkylamide unit represented by the formula (I):

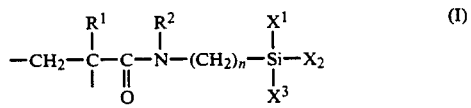

wherein $R^1$ is a methyl group or a hydrogen atom, $R^2$ is a hydrogen atom or a hydrocarbon group having 1 to 15 carbon atoms, n is an integer of 1 to 3, $X^1$, $X^2$ and $X^3$ may be the same or different and are each a methyl group, a trimethylsiloxy group, an organosiloxy group having not more than 16 Si atoms or a Z group which is a group represented by the formula (II)

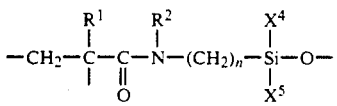

(II)

wherein $R^1$, $R^2$ and n are same as defined above, $X^4$ and $X^5$ may be the same or different and are each a methyl group, a trimethylsiloxy group, an organosiloxy group having not more than 16 Si atoms or a Z group which is the same as above; and a monomer unit containing fluorine atom.

With increasing number of Si atoms, the obtained resin is improved in oxygen permeability but becomes soft and fragile. It therefore is preferred that the number of Si atoms be 1 to about 10 per amide group.

The copolymer used in the present invention can be prepared by copolymerizing 30 to 80 weight parts of a monomer represented substantially by the following formula (I'):

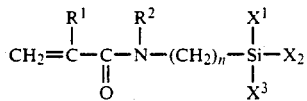

(I')

wherein $R^1$, $R^2$ and n are as defined above, and $X^1$, $X^2$ and $X^3$ may be the same or different and are each a methyl group, a trimethylsiloxy group, an organosiloxy group having not more than 16 Si atoms or a Z' group which is a group represented by the formula (II')

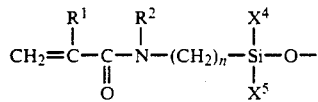

(II')

wherein $R^1$, $R^2$ and n are same as defined above, $X^4$ and $X^5$ may be the same or different and are each a methyl group, a trimethylsiloxy group, an organosiloxy group having not more than 16 Si atoms or a Z' group which is the same as above; with 70 to 20 weight parts of a monomer containing fluorine.

The monomers represented by formula (I') are for example those represented by the following formula (III):

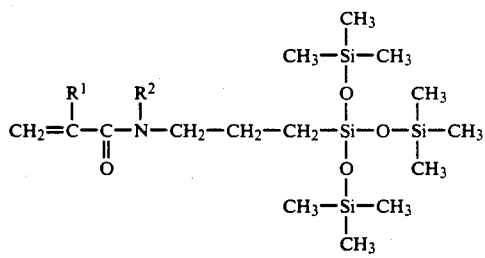

(III)

wherein $R^1$ and $R^2$ are the same as before. More concrete examples are:
N-[tris(trimethylsiloxy)silyl]propylacrylamide,
N-[tris(trimethylsiloxy)silyl]propylmethacrylamide,
N-methyl-N-[tris(trimethylsiloxy)silyl]propylacrylamide,
N-methyl-N-[tris(trimethylsiloxy)silyl]propylmethacrylamide,
N-propyl-N-[tris(trimethylsiloxy)silyl]propylacrylamide,
N-propyl-N-[tris(trimethylsiloxy)silyl]propylmethacrylamide,
N-heptyl-N-[tris(trimethylsiloxy)silyl]propylacrylamide,
N-heptyl-N-[tris(trimethylsiloxy)silyl]propylmethacrylamide,
N-dodecyl-N-[tris(trimethylsiloxy)silyl]propylacrylamide,
N-dodecyl-N-[tris(trimethylsiloxy)silyl]propylmethacrylamide and the like.

Examples of other monomers are, e.g. those represented by the following formula (IV):

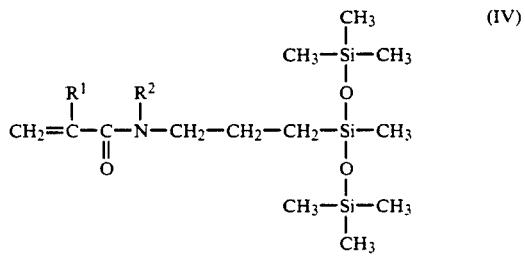

(IV)

wherein $R^1$ and $R^2$ are as defined above; more concretely,
N-[methylbis(trimethylsiloxy)silyl]propylacrylamide,
N-[methylbis(trimethylsiloxy)silyl]propylmethacrylamide,
N-methyl-N-[methylbis(trimethylsiloxy)silyl]propylacrylamide,
N-methyl-N-[methylbis(trimethylsiloxy)silyl]propylmethacrylamide and the like.

Other examples, among others, are:
N-[tris(pentamethyldisiloxy)silyl]propylacrylamide,
N-[tris(pentamethyldisiloxy)silyl]propylmethacrylamide,
N-methyl-N-[tris(pentamethyldisiloxy)silyl]propylacrylamide,
N-methyl-N-[tris(pentamethyldisiloxy)silyl]propylmethacrylamide,
N-[bis(trimethylsiloxy)mono(pentamethyldisiloxy)silyl]propylacrylamide,
N-[bis(trimethylsiloxy)mono(pentamethyldisiloxy)silyl]propylmethacrylamide,
N-methyl-N-[bis(trimethylsiloxy)mono(pentamethyldisiloxy)silyl]propylacrylamide,
N-methyl-N-[bis(trimethylsiloxy)mono(pentamethyldisiloxy)silyl]propylmethacrylamide,
N-[mono(trimethylsiloxy)bis(pentamethyldisiloxy)silyl]propylacrylamide,
N-[mono(trimethylsiloxy)bis(pentamethyldisiloxy)silyl]propylmethacrylamide,
N-methyl-N-[mono(trimethylsiloxy)bis(pentamethyldisiloxy)silyl]propylacrylamide,
N-methyl-N-[mono(trimethylsiloxy)bis(pentamethyldisiloxy)silyl]propylmethacrylamide,
and the like. Further monomers containing 2 or more groups of formula (I) can also be used.

Among the above, methacrylamide-based monomers are preferred from the viewpoint of oxygen permeability and mechanical strength, in which more preferred are N-[tris(trimethylsiloxy)silyl]propylmethacrylamide and N-methyl-N-[tris(trimethylsiloxy)silyl]propylmethacrylamide. These monomers may be used singly or in combination.

The above monomers can be obtained by for example first conducting co-hydrolysis/condensation reaction of a silane coupling agent represented by the following formula (V):

$$R^2-NHCH_2CH_2CH_2Si(OCH_3)_3 \quad (V)$$

wherein $R^2$ is the same as defined above, with an alkyl ether of the corresponding silanol, to obtain an intermediate compound and then reacting the intermediate compound with a (meth)acryloyl chloride.

These monomers have high oxygen permeability due to the presence of a silane or siloxane bond at one end of their molecules, and can be, due to the presence of a double bond at the other end of their molecules, copolymerized with another monomer having an unsaturated bond. Furthermore, these monomers are, since they possess an amide bond which is hydrophilic, compatible with other hydrophilic monomers, thereby causing the obtained copolymers to tend to be more hydrophilic than known silicone compounds.

For the preparation of the oxygen permeable hard contact lens of the present invention, a monomer represented by formula (I') is copolymerized with another monomer containing fluorine, and the obtained copolymer is formed into a lens by a known process such as cutting and grinding. The contact lens can also be directly prepared by conducting the above copolymerization in a mold for lens.

For the purpose of obtaining the hard contact lens with more desirable properties of the present invention, it is preferred to conduct the above copolymerization with 30 to 80% by weight, more preferably 35 to 70% by weight, of the monomer represented by formula (I') and 70 to 20% by weight, more preferably 65 to 30% by weight, of another monomer containing fluorine.

Examples of the monomer containing fluorine are, among others, fluoroalkyl (meth)acrylates, fluorohydroxyalkyl (meth)acrylates, fluoroalkyl itaconates, fluoroalkyl fumarates and fluorostyrene derivatives.

Examples of the fluoroalkyl (meth)acrylates and fluorohydroxyalkyl (meth)acrylates are, among others,
2,2,2-trifluoroethyl methacrylate,
2,2,2-trifluoroethyl acrylate,
2,2,3,3-tetrafluoropropyl methacrylate,
2,2,3,3-tetrafluoropropyl acrylate,
2,2,3,3,3-pentafluoropropyl methacrylate,
2,2,3,3,3-pentafluoropropyl acrylate,
2,2,2-trifluoro-1-trifluoromethylethyl methacrylate,
2,2,2-trifluoro-1-trifluoromethylethyl acrylate,
2,2,3,3-tetrafluoro-t-amyl methacrylate,
2,2,3,3-tetrafluoro-t-amyl acrylate,
2,2,3,4,4,4-hexafluorobutyl methacrylate,
2,2,3,4,4,4-hexafluorobutyl acrylate,
2,2,3,4,4,4-hexafluoro-t-hexyl methacrylate,
2,2,3,4,4,4-hexafluoro-t-hexyl acrylate,
2,2,3,3,4,4,5,5-octafluoropentyl methacrylate,
2,2,3,3,4,4,5,5-octafluoropentyl acrylate,
2,3,4,5,5,5-hexafluoro-2,4-bis(trifluoromethyl)pentyl methacrylate,
2,3,4,5,5,5-hexafluoro-2,4-bis(trifluoromethyl)pentyl acrylate,
2,2,3,3,4,4,5,5,6,6,7,7-dodecafluoroheptyl methacrylate,
2,2,3,3,4,4,5,5,6,6,7,7-dodecafluoroheptyl acrylate,
2-hydroxy-4,4,5,5,6,7,7,7-octafluoro-6-trifluoromethylheptyl methacrylate,
2-hydroxy-4,4,5,5,6,7,7,7-octafluoro-6-trifluoromethylheptyl acrylate,
2-hydroxy-4,4,5,5,6,6,7,7,8,9,9,9-dodecafluoro-8-trifluoromethylnonyl methacrylate,
2-hydroxy-4,4,5,5,6,6,7,7,8,9,9,9-dodecafluoro-8-trifluoromethylnonyl acrylate,
2-hydroxy-4,4,5,5,6,6,7,7,8,8,9,10,11,11,11-hexadecafluoro-10-trifluoromethylundecyl methacrylate and
2-hydroxy-4,4,5,5,6,6,7,7,8,8,9,10,11,11,11-hexadecafluoro-10-trifluoromethylundecyl acrylate.

Examples of the fluoroalkyl itaconates, the fluoroalkyl fumarates and fluorostyrene derivatives are, among others, bis-2,2,2-trifluoroethyl itaconate, t-butyl-(2,2,2-trifluoro-1-trifluoromethyl)ethyl fumarate, isopropyl-(1,1,2,2-tetrahydroperfluoro)octyl fumarate and pentafluorostyrene. Among the above, preferred are 2,2,2-trifluoroethyl methacrylate, 2,2,2-trifluoro-1-trifluoromethylethyl methacrylate and the like, which have 5 to 10 carbon atoms. These monomers may be used singly or in combination of 2 or more.

Further another hydrophilic monomer or a crosslinking agent may be added for the purpose of improving wettability. Examples of the hydrophilic monomer used here are methacrylic acid, 2-hydroxyethylmethacrylate, 2-hydroxyethylacrylate, N-vinylpyrrolidone, dimethylacrylamide and the like; and examples of the crosslinking agent are ethylene glycol dimethacrylate, ethylene glycol diacrylate, diethylene glycol dimethacrylate, diethylene glycol diacrylate, triethylene glycol dimethacrylate, triethylene glycol diacrylate, tetradecaethylene glycol dimethacrylate, tetradecaethylene glycol diacrylate, allyl methacrylate, allyl acrylate, trimethylolpropane trimethacrylate, trimethylolpropane triacrylate, 1,3-butanediol dimethacrylate, 1,3-butanediol diacrylate, 1,4-butanediol dimethacrylate, 1,4-butanediol diacrylate, 1,6-hexanediol dimethacrylate, 1,6-hexanediol diacrylate, 1,9-nonanediol dimethacrylate, 1,9-nonanediol diacrylate, 1,10-decanediol dimethacrylate, 1,10-decanediol diacrylate, neopentyl glycol dimethacrylate, neopentyl glycol diacrylate, 2,2'-bis[p-(γ-methacryloxy-β-hydroxypropoxy)phenyl]propane and the like. Among the above, the use of 1,10-decanediol dimethacrylate is, since it provides contact lenses having high mechanical strength, preferred for the purpose of obtaining the oxygen permeable hard contact lenses of the present invention. These crosslinking agents are used generally in an amount of 0.1 to 20% by weight, preferably in an amount of 0.5 to 15% by weight.

In the present invention, copolymers comprising as essential constituents, N-[tris(trimethylsiloxy)silyl]propyl methacrylamide, 2,2,2-trifluoroethyl methacrylate and 1,10-decanediol dimethacrylate are most desirable for obtaining the oxygen permeable hard contact lenses of the present invention.

Further in the copolymerization according to the present invention, there may further be added alkyl (meth)acrylates, silicone (meth)acrylates, vinyl esters, styrene compounds, allyl compounds or the like to the extent not to adversely affect the required characteristics of the contact lens, such as oxygen permeability, transparency and resistance to soiling. These compounds may, if ever, be used generally in an amount of not more than 50% by weight based on the weight of the copolymer composed of siloxanylamide units and fluorine-containing monomer units. Among the aforementioned compounds, alkyl (meth)acrylates having 4 to 19 carbon atoms are preferably used in view of oxygen permeability, mechanical strength, wettability and resistance to soiling. Examples of the alkyl (meth)acrylates are, among others, methyl methacrylate, methyl acrylate, ethyl methacrylate, ethyl acrylate, isopropyl methacrylate, isopropyl acrylate, t-butyl methacrylate, t-butyl acrylate, isobutyl methacrylate, isobutyl acrylate, t-amyl methacrylate, t-amyl acrylate, 2-ethylhexyl methacrylate, 2-ethylhexyl acrylate, lauryl methacrylate, lauryl acrylate, cyclohexyl methacrylate and cyclohexyl acrylate. Among these, preferably used are those having 4 to 10 carbon atoms, such as methyl methacrylate and cyclohexyl methacrylate. These compounds may be used singly or in combination of 2 or more.

It is also possible that a dye be, if necessary, added to the mixture of a monomer represented by formula (I') and another monomer containing fluorine, followed by a known polymerization process, to obtain the copolymers of the present invention.

In the case where a catalyst is used for polymerization, the catalyst is appropriately selected from for example benzoyl peroxide, 2,2'-azobisisobutyronitrile, 2,2'-azobismethyl isobutylate and 2,2'-azobisdimethylvaleronitrile. The polymerization catalyst is preferably used in an amount of 0.01 to 5% by weight based on the weight of the whole mixture.

Besides the above, photopolymerization, radiation polymerization or the like may also be employed.

The copolymer thus obtained is cut and ground to give contact lenses. Or, the mixture of the above monomers can be polymerized in a mold to directly form a lens. By these processes there can be obtained oxygen permeable hard contact lenses which have high oxygen permeability, sufficient wettability and high resistance to soiling by lipids or the like.

Other features of the invention will become apparent in the course of the following descriptions of exemplary exbodiments which are given for illustration of the invention and are not intended to be limiting thereof.

EXAMPLES

In the examples, "parts" means "parts by weight", and various characteristics were measured as follows:

Oxygen permeability was measured with Oxygen Gas Permeator available from Rikaseiki Kogyo Co., Ltd.

Vickers hardness was measured with a micro hardness tester, Model MVK-F, available from Akashi Seisakusho Co., Ltd.

Contact angle was measured with Goniometer-type contact angle meter, Model G-1, available from Erma Optical Works Ltd. The contact angle is a measure for wettability and a smaller contact angle indicates better wettability.

Resistance to Soiling

A circular specimen taken from the copolymer having a diameter of 13 mm and a thickness of 1 mm was immersed in a physiological saline solution containing 0.1% by weight of lysozyme (egg albumen, available from Wako Pure Chemical Industries Ltd.) at a room temperature for 48 hours. The specimen was taken out from the solution and air-dried. The specimens before and after the immersion was tested for transmittance of a visible light with wavelength of 400 nm using a double-beam spectrophotometer (Model 228A, available from Hitachi, Ltd.). Smaller reduction in the transmittance by the immersion means higher resistance to soiling.

REFERENCE EXAMPLE 1

Synthesis of 3-[tris(trimethylsiloxy)silyl]propylamine

A 1000-ml Ehrenmeyer flask containing 500 g of distilled water was charged with 25.0 g of a commercially available 3-aminopropyltriethoxysilane (LS3150, made by Shin-Etsu Chemical Co., Ltd.) and 71.0 g of methoxytrimethylsilane (LS510, made by Shin-Etsu Chemical Co., Ltd.). The mixture was stirred with a magnetic stirrer at room temperature for 16 hours, and then allowed to stand still. The resulting supernatant was separated and the bottom layer was subjected to extraction with ethyl ether. The supernatant and the extract were mixed with each other and thereafter ethyl ether was evaporated off from the mixture using a rotary evaporator at 50° C. The residue was distilled in vacuo to give 18.3 g of a distillate at 107° C./2 mmHg.

The distillate was a colorless transparent liquid with low viscosity. Gas chromatography with FID detector (silicone: SE-30, column: 3 mm$\phi$×3 m, column temperature: 70°→200° C. at a temperature raise rate of 5° C./min) on the distillate revealed that it contained 97.5% by weight of a single component, which showed, by gas chromatography-mass spectroscopy, a parent peak at m/e=353 and was thus confirmed to be 3-[tris(trimethylsiloxy)silyl]propylamine.

Synthesis of N-[tris(trimethylsiloxy)silyl]propylmethacrylamide

In 200 ml of ethyl ether was dissolved 36.6 g of the 3-[tris(trimethylsiloxy)silyl]propylamine obtained above, and the solution was added with 9.5 g of pyridine. The mixture was cooled in ice bath to 0°–5° C. Separately, 12.6 g of methacryloyl chloride was dissolved in 30 ml of ethyl ether. The methacryloyl chloride solution was placed in a separating funnel and dropped therefrom to the above mixture over about one hour. The mixture was continuously stirred for 16 hours. After the stirring, 200 ml of water was added to the reaction mixture, and the resulting mixture was stirred and the supernatant was separated. The supernatant was combined with the extract from the bottom layer with ethyl ether, and then ethyl ether was removed by heating. The residue was distilled in vacuo to give 36.6 g of a distillate at 165° C./2 mmHg.

Figure 2:
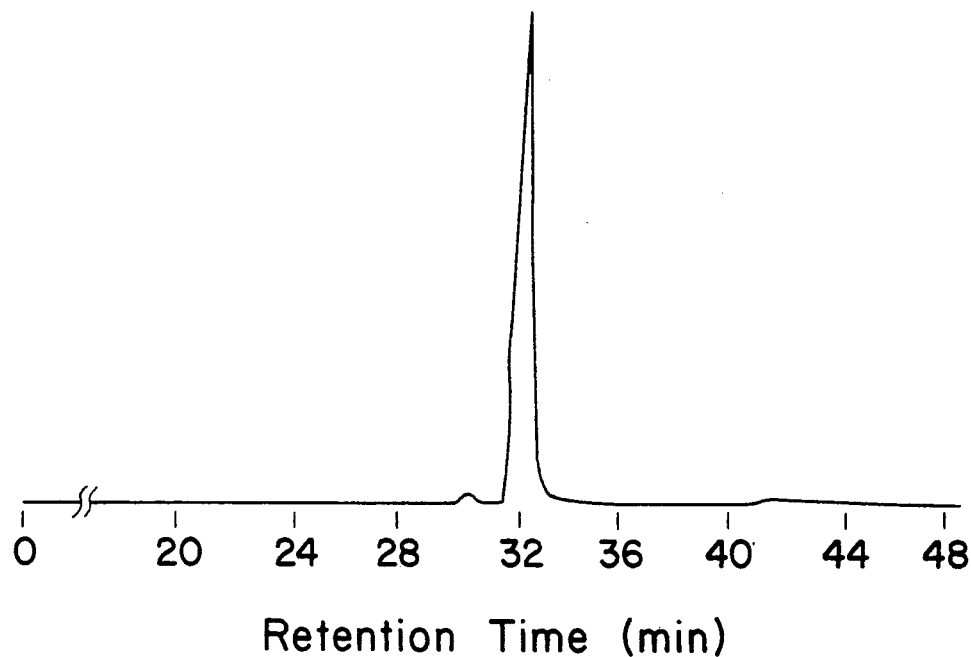
FIG. 2 is its gas chromatogram.

The distillate was a viscous, colorless and transparent solid. The same gas chromatography as described above revealed that the distillate contained 98.8% by weight of a single component, which showed, by gas chromatography-mass spectroscopy, a parent peak at m/e=421. The infrared absorption spectrum and gas chromatogram of the substance were as shown in FIGS. 1 and 2, respectively. The infrared absorption spectrum had a peak of double bond at 1660 cm$^{-1}$, one of Si—O—Si at 1050 cm$^{-1}$, one of methyl group at 2950 cm$^{-1}$, ones of Si—CH$_3$ at 1250 cm$^{-1}$ and 840 cm$^{-1}$, and one of N—H at 3300 cm$^{-1}$.

From the above results of analyses, the substance was confirmed to be N-[tris(trimethylsiloxy)silyl]propylmethacrylamide.

REFERENCE EXAMPLE 2

Synthesis of N-methyl-3-[tris(trimethylsiloxy)silyl]propylamine

A 1000-ml Ehrenmeyer flask containing 500 g of distilled water was charged with 25.0 g of a commercially available 3-(N-methyl)aminopropyltrimethoxysilane (M8620, available from Chisso Corporation) and 81.0 g of methoxytrimethylsilane (LS510, made by Shin-Etsu Chemical Co., Ltd.). The mixture was stirred with a magnetic stirrer at room temperature for 16 hours, and then allowed to stand still. The resulting supernatant was separated and the bottom layer was subjected to extraction with ethyl ether. The supernatant and the extract were combined with each other and thereafter ethyl ether was evaporated off from the mixture using a rotary evaporator at 50° C. The residue was distilled in vacuo to give 15.0 g of a distillate at 101° C./3 mmHg.

The distillate was a colorless transparent liquid with low viscosity. Gas chromatography with FID detector (silicone: SE-30, column: 3 mm$\phi \times$ 3 m, column temperature: 70°→200° C. at a temperature raise rate of 5° C./min) on the distillate revealed that it contained 98.1% by weight of a single component, which showed, by gas chromatography-mass spectroscopy, a parent peak at m/e=367 and was thus confirmed to be N-methyl-3-[tris(trimethylsiloxy)silyl]propylamine.

Synthesis of
N-methyl-N-[tris(trimethylsiloxy)silyl]propylmethacrylamide

In 200 ml of ethyl ether was dissolved 32.6 g of the N-methyl-3-[tris(trimethylsiloxy)silyl]propylamine obtained above, and the solution was added with 11 g of pyridine. The mixture was cooled in ice bath to 0°-5° C. Separately, 14.5 g of methacryloyl chloride was dissolved in 45 ml of ethyl ether. The methacryloyl chloride solution was placed in a separating funnel and dropped therefrom to the above mixture over about one hour. The mixture was continuously stirred for 16 hours. After the stirring, 200 ml of water was added to the reaction mixture, and the resulting mixture was stirred and then supernatant was separated. The supernatant was combined with the extract from the bottom layer with ethyl ether, and then ethyl ether was removed by heating. The residue was distilled in vacuo to give 33.0 g of a distillate at 155° C./3 mmHg.

Figure 4:
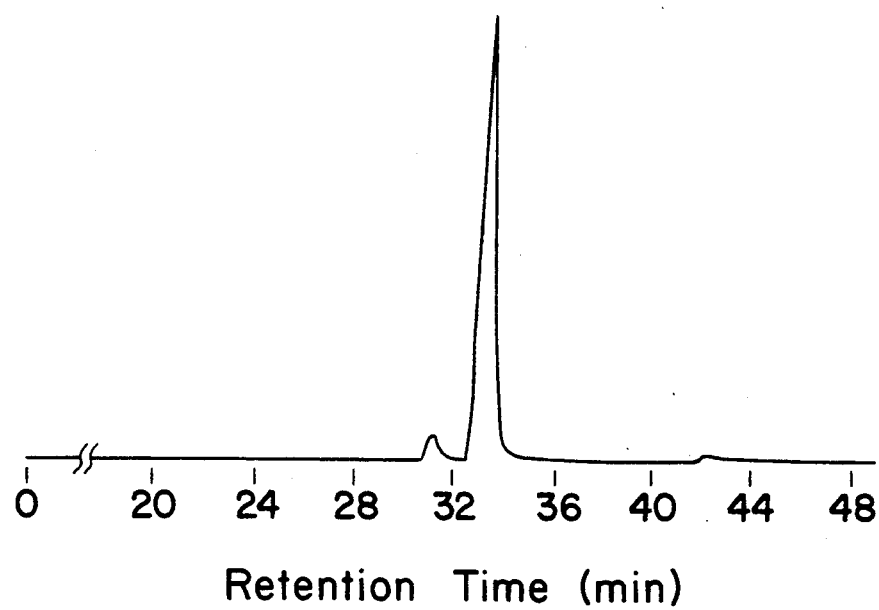
FIG. 4 is its gas chromatogram.

The distillate was a viscous, colorless and transparent liquid, which had a refractive index at 20° C. of 1.435. The same gas chromatography as described above revealed that the distillate contained 98.5% by weight of a single component, which showed, by gas chromatography-mass spectro-scopy, a parent peak at m/e=435. The infrared absorption spectrum and gas chromatogram of the substance were as shown in FIGS. 3 and 4, respectively. The infrared absorption spectrum had a peak of double bond at 1640 cm$^{-1}$, one of Si—O—Si at 1060 cm$^{-1}$, one of methyl group at 2950 cm$^{-1}$ and ones of Si—CH$_3$ at 1250 cm$^{-1}$ and 840 cm$^{-1}$.

The elemental analysis of the substance showed:

| $C_{17}H_{41}O_4NSi_4$ | | |
| --- | --- | --- |
|   | Calcd. (%) | Found (%) |
| C | 46.8 | 46.7 |
| H | 9.5 | 9.6 |
| N | 3.2 | 3.2 |

EXAMPLE 1

A mixture was prepared from 30 parts of the N-[tris(trimethylsiloxy)silyl]propylmethacrylamide obtained in Reference Example 1, 10 parts of methyl methacrylate, 50 parts of 2,2,2-trifluoroethyl methacrylate and 10 parts of ethylene glycol dimethacrylate. A polymerization catalyst of 2,2'-azobisdimethylvaleronitrile was added in an amount of 0.15 part to the mixture. The resulting mixture was taken into a 20-ml capacity polypropylene test tube, and, after replacement of the internal air with nitrogen gas, the tube was sealed.

The test tube was immersed in a constant-temperature water-circulating bath and the contents were permitted to polymerized at 35° C. for 65 hours, at 40° C. for 24 hours and at 50° C. for 5 hours, successively. The test tube was put in a hot-air drying oven and further subjected to polymerization at 80° C. for 2 hours, at 100° C. for 1 hour and finally at 110° C. for 1 hour.

The polymer thus obtained was colorless transparent solid. The polymer gave, by cutting and grinding, a hard contact lens.

The characteristics of the polymer are shown in Table 1.

EXAMPLE 2

A mixture was prepared from 30 parts of the N-methyl-N-[tris(trimethylsiloxy)silyl]propylmethacrylamide obtained in Reference Example 2, 10 parts of methyl methacrylate, 50 parts of 2,2,2-trifluoroethyl methacrylate and 10 parts of ethylene glycol dimethacrylate. A polymerization catalyst of 2,2'-azobisdimethylvaleronitrile was added in an amount of 0.2 part to the mixture. The resulting mixture was taken into a polypropylene test tube, and, after replacement of the internal air with nitrogen gas, the tube was sealed.

The test tube with the contents was heated at 40° C. for 64 hours, at 50° C. for 5 hours, at 80° C. for 2 hours, at 100° C. for 1 hour and finally at 120° C. for 1 hour, to effect polymerization.

The polymer thus obtained gave a hard contact lens by cutting and grinding. The characteristics of the polymer are shown in Table 1.

EXAMPLES 3 THROUGH 13

Mixtures comprising compositions shown in Table 1 were prepared and subjected to the same polymerization procedures as in Example 1 to give polymers. The characteristics of the polymers obtained were as shown in Table 1

EXAMPLE 14

Example 1 was repeated with the composition shown in Table 1 which includes as silicone monomer the bottoms by the vacuum distillation for the synthesis of N-[tris(trimethylsiloxy)silyl]propylmethacrylamide in Reference Example 1, the bottoms being a compound having 2 or more methacrylamide groups in the molecule thereof, to obtain a polymer. The characteristics of the thus obtained polymer are shown in Table 1.

COMPARATIVE EXAMPLE 1

Example 1 was repeated except for using 30 parts of 3-methyacryloxypropyltris(trimethylsiloxy)silane instead of 30 parts of N-[tris(trimethylsiloxy)silyl]propylmethacrylamide to obtain a polymer. The contact lens prepared from the thus obtained polymer was of characteristics as shown in Table 1.

TABLE 1-1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Composition (parts) | | | | | | | | | | |
| Silicone Monomer | N-TRIS 30 | N-MeTRIS 30 | N-DoTRIS 40 | N-HpTRIS 40 | N-BIS 40 | N-TRIS 45 | N-TRIS 40 | N-TRIS 45 | N-TRIS 45 | N-TRIS 45 |
| Methyl methacrylate | 10 | 10 | 20 | 20 | 20 | 10 | 25 | 5 | 25 | 25 |
| 3FM | 50 | 50 | 40 | 40 | 40 | 30 | 25 | 40 | 30 | |
| 6FM | | | | | | | | | | 30 |
| 8FM | | | | | | | | | | |
| 17FM | | | | | | | | | | |
| 19FMOH | | | | | | | | | | |
| Ethylene glycol dimethacrylate | 10 | 10 | | | | | | | | |
| 1,10-Decanediol dimethacrylate | | | | | | 10 | 10 | 10 | | |
| Methacrylic acid | | | | | | 5 | | | | |
| ADMVN | 0.15 | 0.15 | 0.15 | 0.15 | 0.15 | 0.25 | 0.25 | 0.25 | 0.15 | 0.15 |
| Characteristics | | | | | | | | | | |
| Oxygen permeability* | 96 | 92 | 85 | 88 | 85 | 96 | 81 | 98 | 92 | 91 |
| Contact angle* | 53 | 55 | 73 | 70 | 62 | 50 | 61 | 63 | 65 | 69 |
| Appearance | colorless, transparent | same as left | same as left | same as left | same as left | same as left | same as left | same as left | same as left | same as left |
| Soiling characteristic** | 5.6 | 5.9 | 9.4 | 8.0 | 6.6 | 5.0 | 5.5 | 6.2 | 5.9 | 6.5 |

\* $\times 10^{-11}$ cc · cm/cm$^2$ · sec · mmHg
\*\*Reduction (%) in light transmittance

TABLE 1-2

| | Ex. 11 | Ex. 12 | Ex. 13 | Ex. 14 | Comp. Ex. 1 |
|---|---|---|---|---|---|
| Composition (parts) | | | | | |
| Silicone Monomer | N-TRIS 45 | N-TRIS 45 | N-TRIS 45 | Bottoms of Ref. Ex. 1 40 | TRIS 30 |
| Methyl methacrylate | 25 | 25 | 25 | 20 | 10 |
| 3FM | | | | 40 | 50 |
| 6FM | | | | | |
| 8FM | 30 | | | | |
| 17FM | | 30 | | | |
| 19FMOH | | | 30 | | |
| Ethylene glycol dimethacrylate | | | | | 10 |
| 1,10-Decanediol dimethacrylate | | | | | |
| Methacrylic acid | | | | | |
| ADMVN | 0.15 | 0.15 | 0.15 | 0.25 | 0.15 |
| Characteristics | | | | | |
| Oxygen permeability* | 91 | 99 | 91 | 84 | 88 |
| Contact angle* | 69 | 67 | 65 | 75 | 79 |
| Appearance | colorless, transparent | slightly cloudy | colorless, transparent | same as left | same as left |
| Soiling characteristic** | 7.0 | 6.8 | 5.1 | 9.0 | 11.2 |

\* $\times 10^{-11}$ cc · cm/cm$^2$ · sec · mmHg
\*\*Reduction (%) in light transmittance
N-TRIS: N-[tris(trimethylsiloxy)silyl]propylmethacrylamide
N-MeTRIS: N-methyl-N-[tris(trimethylsiloxy)silyl]propylmethacrylamide
N-DoTRIS: N-dodecyl-N-[tris(trimethylsiloxy)silyl]propylacrylamide
N-HpTRIS: N-heptyl-N-[tris(trimethylsiloxy)silyl]propylmethacrylamide
N-BIS: N-[methylbis(trimethylsiloxy)silyl]propylmethacrylamide
3FM: 2,2,2-trifluoroethyl methacrylate
6FM: 2,2,2-trifluoro-1-trifluoroethyl methacrylate
17FM: 3,3,4,4,5,5,6,6,7,7,8,8,9,9,10,10,10-heptadecafluorodecanyl methacrylate
19FMOH: 2-hydroxy-4,4,5,5,6,6,7,7,8,8,9,9,10,11,11,11-hexadecafluoro-10-trifluoromethylundecyl methacrylate
ADMVN: 2,2'-azobisdimethylvaleronitrile
TRIS: tris(trimethylsiloxy)silylpropyl methacrylate

EXAMPLES 15 THROUGH 23

Example 1 was repeated with mixtures comprising compositions shown in Table 2, to obtain polymers. The polymers were then formed, by cutting and groundings, into hard contact lenses each having a base curve of 7.50 mm, a diameter of 8.8 mm and a power of −3.00. The lenses were subjected to a compression test using a tensile tester (AUTOGRAPH, Model AGS-50A, available from Shimadzu Corporation). The lenses were compressed radially at a rate of 200 mm/min until breakage. The results are summarized in Table 2.

The foregoing Examples and Comparative Examples clearly show that the hard contact lens of the present invention is excellent in oxygen permeability, wettability, resistance to soiling and mechanical strength.

Obviously, numerous modifications and variations of the present invention are possible in light of the above teachings. It is therefore to be understood that within the scope of the appended claims, the invention may be practiced otherwise than as specifically described herein.

TABLE 2

| | Example No. | | | | | | | | |
|---|---|---|---|---|---|---|---|---|---|
| | 15 | 16 | 17 | 18 | 19 | 20 | 21 | 22 | 23 |
| Composition (parts) | | | | | | | | | |
| Silicone monomer | N-TRIS 45 | N-TRIS 45 | N-TRIS 45 | N-TRIS 45 | N-TRIS 55 | N-TRIS 55 | N-TRIS 50 | N-TRIS 50 | N-TRIS 55 |
| Methyl methacrylate | 10 | 10 | 5 | 5 | 15 | 15 | 15 | 15 | 15 |
| 3FM | 40 | 40 | 40 | 40 | 25 | 25 | 25 | 25 | 25 |
| Ethylene glycol dimethacrylate | | | | | | | | | 5 |
| Trimethylolpropane trimethacrylate | 5 | | | | 5 | | | | |
| Neopentylglycol dimethacrylate | | 5 | | | | | 5 | | |
| 1,10-decanediol dimethacrylate | | | 10 | | | | | 10 | |
| Tetraethylene glycol dimethacrylate | | | | 10 | | | | | 10 |
| ADMVN | 0.15 | 0.15 | 0.15 | 0.15 | 0.15 | 0.15 | 0.15 | 0.15 | 0.15 |
| Characteristics | | | | | | | | | |
| Oxygen permeability* | 105 | 99 | 98 | 99 | 100 | 113 | 90 | 95 | 111 |
| Compressive strength (g) | 166 | 315 | <400 | 197 | 105 | 202 | 288 | 105 | 209 |

*$\times 10^{-11}$ cc · cm/cm$^2$ · sec · mmHg

What is claimed is:

1. An oxygen permeable hard contact lens formed of a copolymer comprising as its essential components:
   a siloxanylalkylamide unit represented by the formula (I):

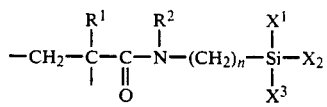

wherein R$^1$ is a methyl group or a hydrogen atom, R$^2$ is a hydrogen atom or a hydrocarbon group having 1 to 15 carbon atoms, n is an integer of 1 to 3, X$^1$, X$^2$ and X$^3$ may be the same or different and are each a methyl group, a trimethylsiloxy group, an organosiloxy group having not more than 16 Si atoms or a Z group which is a group represented by the formula (II):

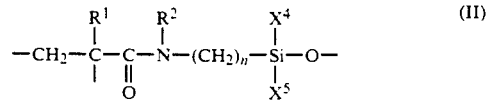

wherein R$^1$, R$^2$ and n are same as defined above, X$^4$ and X$^5$ may be the same or different and are each a methyl group, a trimethylsiloxy group, an organosiloxy group having not more than 16 Si atoms or a Z group which is the same as above, and a monomer unit containing fluorine.

2. An oxygen permeable hard contact lens according to claim 1, wherein R$^1$ is a methyl group.

3. An oxygen permeable hard contact lens according to claim 1, wherein R$^2$ is a hydrogen atom.

4. An oxygen permeable hard contact lens according to claim 1, wherein said siloxanylalkylamide unit and said monomer unit containing fluorine are contained in amounts of 30 to 80 parts by weight and 70 to 20 parts by weight, respectively.

5. An oxygen permeable hard contact lens according to claim 1, said copolymer further comprising a crosslinking agent.

6. An oxygen permeable hard contact lens according to claim 5, wherein said crosslinking agent is 1,10-decanediol dimethacrylate.

7. An oxygen permeable hard contact lens according to claim 5, wherein said crosslinking agent is contained in an amount of 0.1 to 20% by weight based on the weight of said copolymer.

8. An oxygen permeable hard contact lens formed of a copolymer comprising as essential components:
   N-[tris(trimethylsiloxy)silyl]propylmethacrylamid,
   2,2,2-trifluoroethyl methacrylate and
   1,10-decanediol dimethacrylate.

* * * * *